(12) United States Patent
Burg et al.

(10) Patent No.: US 6,427,075 B1
(45) Date of Patent: Jul. 30, 2002

(54) APPARATUS AND METHOD FOR DELIVERING DATA IN A CELLULAR COMMUNICATIONS NETWORK

(75) Inventors: Bernard Burg, Paris (FR); Philippe Sartori, Schaumburg, IL (US); David T. L. Bonnefoy Cudraz, Gilly sur Isere (FR)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/484,388

(22) Filed: Jan. 14, 2000

(30) Foreign Application Priority Data

Apr. 21, 1999 (EP) .............................................. 99400966

(51) Int. Cl.7 ................................................. H04Q 7/20
(52) U.S. Cl. ......................... 455/422; 455/432; 455/456
(58) Field of Search ................................. 455/436, 432, 455/429, 428, 437, 439, 440, 441, 443, 446, 456, 422, 457, 458; 342/357.07, 357.08, 357.09, 357.13; 704/213, 214

(56) References Cited

U.S. PATENT DOCUMENTS

| | | | |
|---|---|---|---|
| 4,907,290 A | * 3/1990 | Crompton | ................... 455/524 |
| 5,572,221 A | 11/1996 | Marlevi et al. | |
| 5,687,217 A | * 11/1997 | Bliss et al. | .................. 455/423 |
| 5,825,759 A | * 10/1998 | Liu | ............................. 370/331 |

* cited by examiner

Primary Examiner—Daniel Hunter
Assistant Examiner—N. Mehrpour
(74) Attorney, Agent, or Firm—Kenneth A. Haas

(57) ABSTRACT

Data delivery in GSM and UMTS co-existing networks is controlled by apparatus located within the network infrastructure which predicts the trajectory of a moving mobile station (26) requesting transmission or reception of data. By knowing the trajectory of the mobile station (26), the transmission can be made in an optimum manner by setting an appropriate transmission rate or delaying transmission until the mobile station (26) reaches a cell (18) able to accommodate faster data rates than its neighbours (17, 19). The trajectory prediction is based on a learning process whereby a large population of mobile stations' behaviour in a designated zone (5) is monitored over a period of time. Mobile stations with like behaviourial characteristics are grouped together. A mobile station (26) requesting a service for data transmission is matched to one of the recorded groups from which its trajectory can be predicted. The invention has been shown to be able to cut down the transmission times and improve the call drop rate.

5 Claims, 3 Drawing Sheets

APPARATUS AND METHOD FOR DELIVERING DATA IN A CELLULAR COMMUNICATIONS NETWORK

Figure 1:
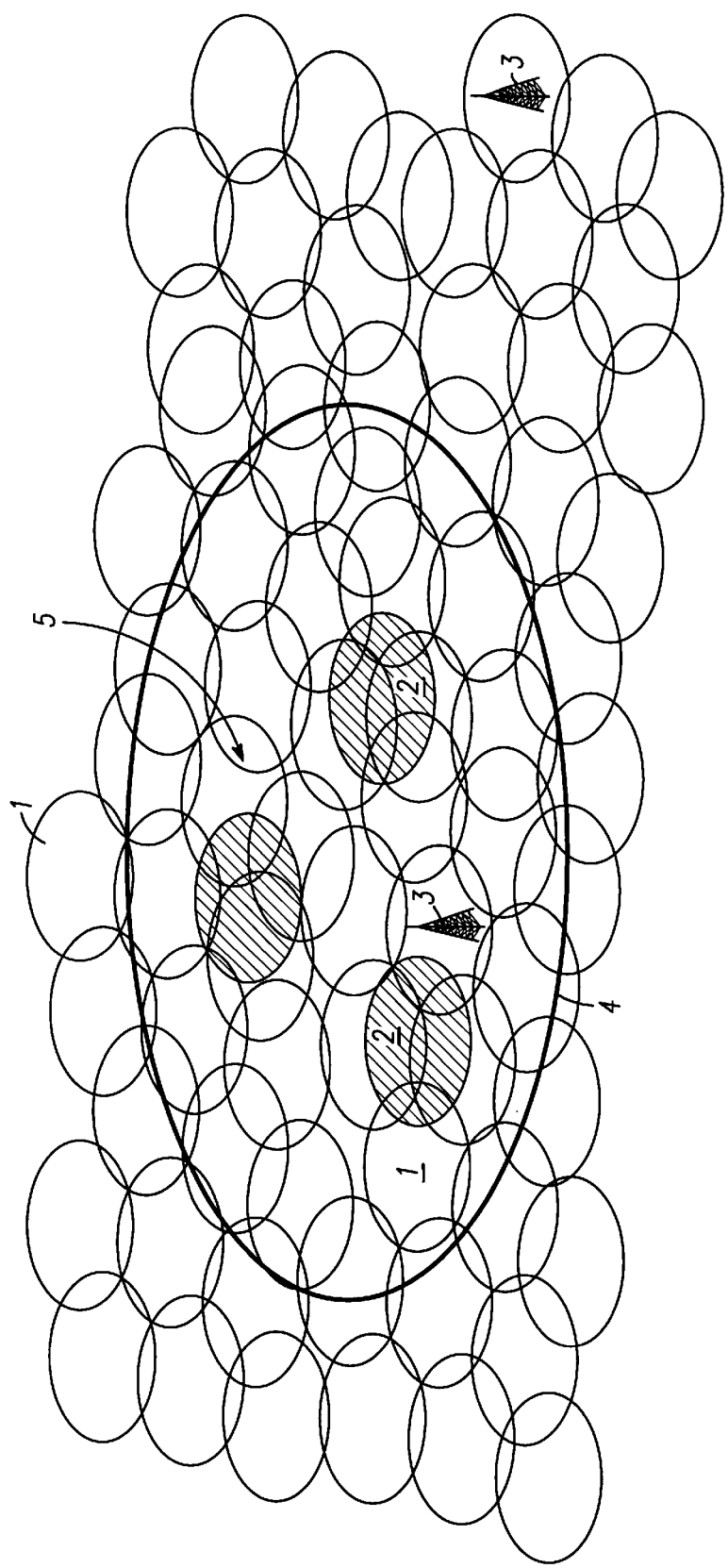

This invention relates to cellular communications systems and particularly to the transmission and reception of data within a cellular network.

Cellular radio telecommunications networks generally include mobile services switching centres (MSC) coupled to a public switched telephone network (PSTN), base transceiver stations (BTS) and radio telephone subscriber units often referred to as mobile stations.

Each of a plurality of base transceiver stations generally defines a geographic region or cell proximate to the BTS to produce coverage areas. Cell sizes range typically from 200 meters in diameter in urban areas to 60 kilometers in rural areas. Often, base transceiver stations are positioned at regular intervals close to main roads in order to give communications service coverage to motorists. Each BTS comprises the radio frequency components and the antenna for communicating with the mobile stations. Usually, several base transceiver stations are under the control of a base station controller (BSC) which in turn communicates directly by a land line or microwave link with an MSC. Several base station controllers may report to one MSC.

Multiple access techniques permit the simultaneous transmissions from several mobile stations to a single BTS. The GSM System (global system for mobile communications) uses time division multiple access (TDMA), in which a communications channel consists of a time slot in a periodic train of time intervals over the same frequency. Each mobile station is allocated one specific time slot for communication with a BTS in a repeating time frame. Another type of multiple access technique, and one proposed for the third generation universal mobile telecommunication system (UMTS) is known as code division multiple access (CDMA) which employs spread-spectrum signaling. Individual users in the CDMA communications network use the same RF carrier frequency, but are separated by the use of individual spreading codes. Hence, multiple communications channels are allocated using a plurality of spreading codes within the portion of radio spectrum, each code being uniquely assigned to a mobile station.

By means of the aforementioned network components, a cellular network is able to (amongst other things) monitor the number of calls made by a mobile station, control the "handover" of the communications link from the mobile station to the base transceiver stations as it moves from one cell to another, calculate the round trip time (often referred to as the timing advance) of the communications link between the mobile station and the BTS and track a mobile station's location within the network by means of a location update sequence.

In addition to speech, there is a trend for other forms of data (e.g. fax, E-Mail, video and multi-media) being delivered through radio telecommunications networks. Since several cellular networks supporting different data rates (e.g. GSM General Packet Radio System (GPRS), the modified form of GSM known as EDGE and UMTS) are to be available in the same geographical area, it is desirable to optimise the delivery of these data in terms of resources allocated by the network (e.g. data rates) and the needs and/or behaviour of the subscriber. This optimisation is of particular interest in the context of UMTS deployment in Europe, which will exist it its first stage in isolated spots (e.g. major cities). As an example, consider a subscriber in a car, intending to send a file of several M-bytes (a typical size of today's documents in use) over the GSM network. Due to very low available bit rates (9.6 kbits today, more if the cell supports general packet radio services), the use of the GSM network presents several drawbacks. For example, the GSM link needs to be maintained for a comparatively long time. This can necessitate multiple handovers whilst the subscriber is in motion and the subsequent increased probability of a call being dropped. Furthermore, the probability of having a transfer problem is proportional to the connection time (it is well know that on the Internet, downloading a file of several M-bytes is a hazardous operation using a low bit rate modem).

For the above reasons, it is beneficial to plan for the data transmission before it is executed. For example, if the future bandwidth availability can be estimated, then the data transmission process can be optimised.

U.S. Pat. No. 5,572,221 (Marveli et al) discloses methods for predicting movements of mobile radio transceivers, thus facilitating selection of a cell for future handover. This method's criteria are static and do not offer dynamic selection to always best quality service. Besides, this method relies on learning the movement patterns of each of the mobile radio transceivers. As these are linked to the personal habits of users, the learning task is burdensome and leads to unreliable results.

This invention aims to provide a method and apparatus for predicting the future trajectory and hence communication capabilities of a mobile station, thereby permitting the network to plan and execute optimally data delivery to or from the mobile station.

According to a first aspect of the invention, apparatus for controlling the transmission of data between a base station and a mobile station in a cellular radio telecommunications network comprises;

Means for monitoring and storing data relating to the movements of a plurality of individual mobile stations in a designated geographical area within the network, Means for grouping those mobile stations comprising the plurality of individual mobile stations which share common movement characteristics and for storing said common movement characteristics for each group, Means for receiving a request for transmission of data to or from a mobile station, Means for matching past monitored movements of the mobile station with the stored characteristics of one of said groups, Means for predicting a trajectory of the mobile station from the stored characteristics of said one of said groups, And means for controlling the transmission of data between the base station and the mobile station dependent upon the predicted trajectory.

The apparatus may be incorporated in a mobile switching centre or in a base station controller, for example.

According to a second aspect of the invention, a method for controlling the transmission of data between a base station and a mobile station in a cellular radio telecommunications network includes the steps of;

Monitoring data relating to the movements of a plurality of individual mobile stations in a designated geographical area comprising the network, Storing said data, Grouping those mobile stations comprising the plurality of mobile stations which share common movement characteristics, Storing said common movement characteristics for each group, Receiving a request for transmission of data to or from a mobile station, Matching past monitored movements of the mobile station with the stored characteristics of one of said groups, Predicting a trajectory of the mobile station from stored characteristics of said one of said groups, And controlling the transmission of data between the base station and the mobile station dependent upon the predicted trajectory.

Hence, the invention is able to predict the trajectory of a mobile station by previously observing the behaviour of a whole population of the mobile stations over a geographical area, which preferably comprises many cells.

Monitoring of the movements of the mobile station may be done by utilising any one of several measurement techniques known in GSM systems. For example, the mobile station can be tracked (by the MSC, for example) as it hands over from one BTS in a first cell to a second BTS in a second adjacent cell whilst a call is in progress. If a call is not in progress and the mobile station is in idle mode, then the mobile station can be tracked by monitoring its location update requests as it moves from one group of cells having a first local area identity to another group having a second local area identity. The above and other tracking methods are described in the Applicants co-pending Application GB 9818294.2.

The means for controlling the transmission of data maybe configured to adjust data rates or to delay commencement of transmission for a certain period of time, for example.

By being able to predict where the mobile station will be when it receives or transmits its data, the reception/transmission process can be optimised. For example, if is predicted that the mobile station will soon move outside the network's limits, then a fast data rate can be allocated to the transmission.

Preferably, stationary mobile stations in the monitored population are ignored by the grouping process. Such mobile stations do not make a useful contribution to the overall learning process exhibited by the invention. If one particular mobile station is stationary for a long period of time, the best decision is for the data requested to be transmitted immediately at some fixed data rate.

It is not possible to make a completely correct prediction for all mobile stations. However, if a wrong decision is taken, nothing critical will happen (i.e. the call drop rate and quality of service will be the same as it would have been without the learning process offered by the invention). However, the predictions derived from the statistical observation of a population of mobile stations, will statistically improve the probability of making the right decision, thus improving the overall quality of service and call drop rate.

Figure 2:
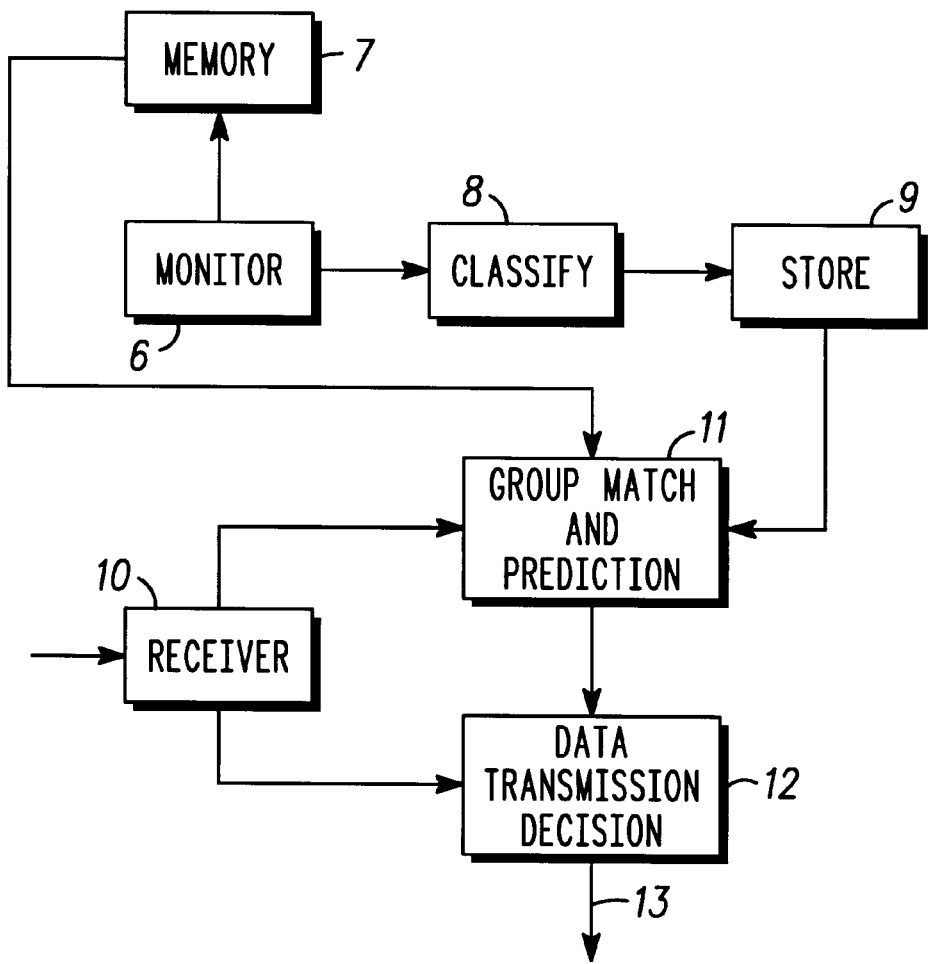
Figure 3:
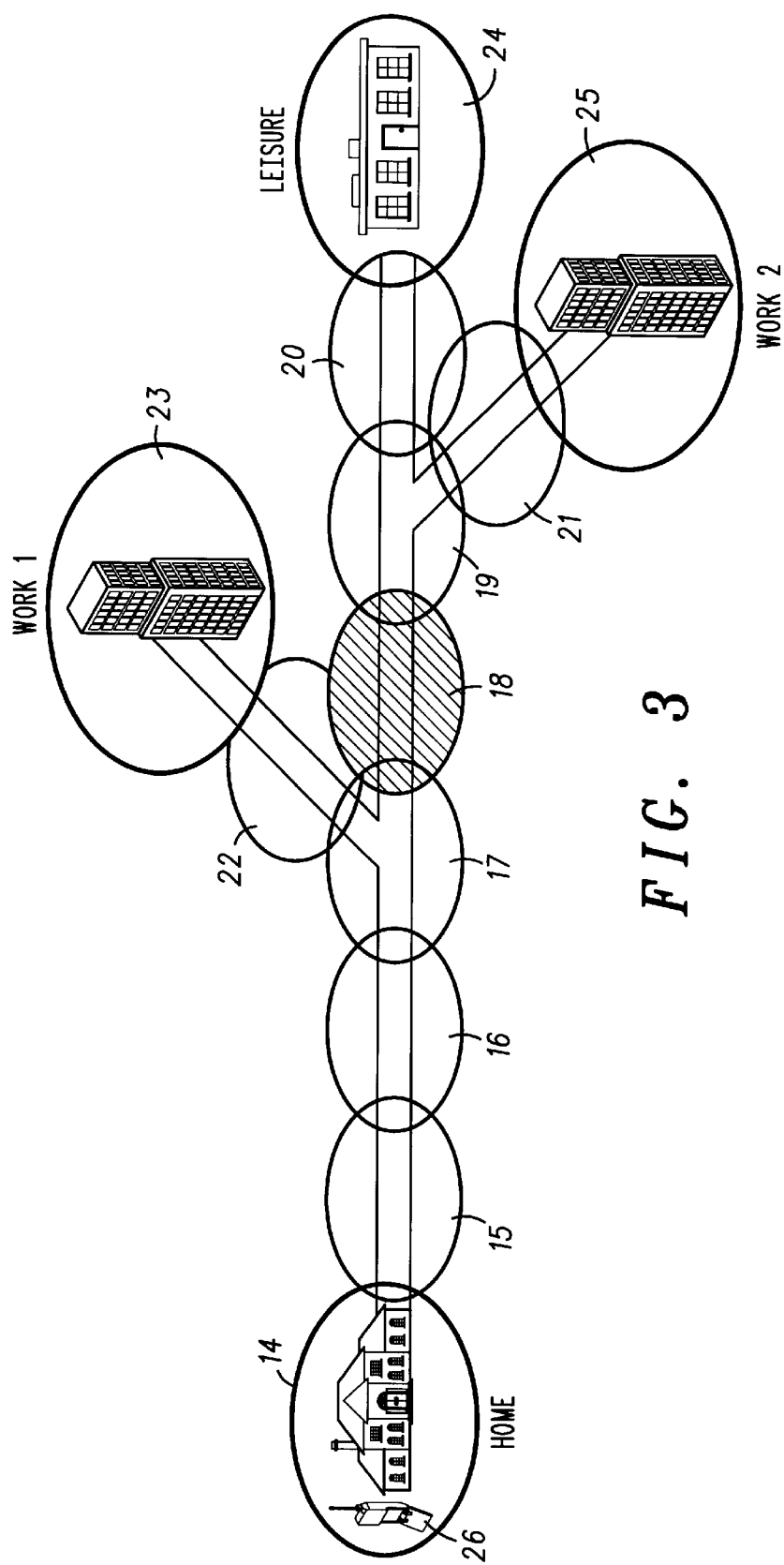

Some embodiments of the invention will now be described by way of example only, with reference to the drawings of which FIG. 1 is a schematic diagram of a communications network;

FIG. 2 is a schematic block diagram of apparatus in accordance with the invention; and FIG. 3 is a schematic diagram illustrating how the apparatus of FIG. 2 can be put into effect.

FIG. 1 shows a plurality of cells 1, 2 in a telecommunications network, most of which are GSM cells and a few (shaded) are UMTS cells. Each cell is served by a base transceiver station (BTS) 3. An ellipse 4 designates a zone 5 which encompasses some GSM cells 1 and some UMTS cells 2. The monitoring process of the invention occurs within the zone 5.

The network randomly chooses some mobile stations within the zone 5 for monitoring. The results of the monitoring process enable prediction of the trajectory of other mobile stations active within or passing through the zone 5. The more mobile stations monitored, the more accurate the predictions will be.

FIG. 2 shows apparatus for controlling reception and transmission of data and is incorporated in a mobile switching centre (MSC) which operates within the network of FIG. 1.

A monitoring module 6 receives information from base transceiver stations (not shown) which are under the control of the MSC. This information relates to the behaviour of those mobile stations which are operating within the zone 5 and registered with the base transceiver stations. For instance, the module 6 receives reports from its affiliated base transceiver stations identifying those mobile stations which are currently registered with particular base transceiver stations. Hence, by receiving these reports, the module 6 is able to monitor the movements of any mobile station moving within the zone 5 from cell to cell.

The monitored movements for each mobile station are stored in a memory module 7.

An output of the monitoring module 6 is fed to a classifying module 8 which classifies each mobile station monitored into groups. Mobile stations exhibiting similar behaviour in their movements over time will be allocated to the same group. Groups are thus distinguishable by their different behaviour patterns.

The characteristics for each group derived by the classifying module 8 are fed to a store 9.

A receiver module 10 receives a signal informing the MSC that a request has been made for a particular mobile station in zone 5 to receive or transmit data. The signal received may be generated by the mobile station's serving BTS in response to a signal from the mobile station, or may have come from the PSTN.

The identity of the particular mobile station in question is transferred from the receiver module 10 to an input of a group matching and prediction module 11. The group matching a prediction module 11 has a second input connected to an output of the memory 7 and a third input connected to an output of the store 9. The purpose of the module 11 is to compare the recent behaviour of the particular mobile station (known from the memory 7) with each classified group's behaviour (from the store 9) in order to determine which group the particular mobile station best matches. On identifying a match to a particular group, the group matching and prediction module 11 then can predict the trajectory of the particular mobile station by reading the chosen groups behaviour pattern from the store 9.

The group matching and prediction module 11 then feeds this predicted trajectory to a data transmission decision module 12. The data transmission decision module 12 also receives an input from the receiver 10 by which it is informed of the nature e.g. size of the data to be transmitted. Knowing the size of the data and the predicted movements of the mobile station in question, the decision module 12 generates a control signal on line 13 which is to be used by the serving BTS which sets the data rate for and time of commencement of the requested transmission.

Optionally, the decision module 12 maybe configured to take other factors into account such as cell loading.

To ensure efficient data delivery, some procedures may be set in case the prediction is wrong. Such counter-measures are well known. It is possible to use time-out processors, or fix spatial limits to ensure that the transmission will actually start.

As the method of the invention takes place at the network level, the involvement of the mobile station is very low. In certain instances it may be required to send the size of the data transfer, the priority order and possibly some optional inputs such as the identity of the last cell it was registered with.

An example of the operation of the invention will now be described with reference to FIG. 3.

Twelve cells 14–25 cover a zone. Some are GSM cells and some (shaded) are UMTS cells. The mobile subscribers live in "home", cell 14. They either work at "work 1" or "work 2". At weekends, they go to "leisure" cell 24. The cells 15–22 cover the intervening roads.

There are 3 defined groups of subscribers. All subscribers in the same group exhibit a similar behaviour. The groups are:

1. The subscribers who work at "work 1". On week days they leave home for work between 08.00 hours and 08.30 (the actual departure time is chosen with a uniform probability) and leave work between 18.00 and 18.30 hours. At the weekend, they start for "leisure" at 13.00 hours and come back at 21.00 hours.
2. The subscribers who work at "work 2". On week days they leave home for work between 10.00 hours and 10.30 hours and leave work between 18.00 hours and 18.30 hours. At the weekend they start for "leisure" at 13.00 hours and return 21.00 hours.
3. Some subscribers who work at "work 1" and who arrive late. They leave home between 11.00 hours and 11.15 hours. Otherwise, they are identical to the first group.

Recorded at constant time intervals for each subscriber are the current day (week day or week end), the current time, the subscriber's location and his location during the for previous time intervals. For instance, for a subscriber 26; weekday, 19.00, 14, 15, 16, 17, 18.

Only those records concerning movements are kept, otherwise, the results are biased because the subscribers stay still for most of the time and so the most useful part of the learning process is hidden.

In this example, it can be deduced that the subscriber 26 falls into the second group.

It will now be shown how this deduction and the stored characteristics of each group's behaviour can be used to reduce the transmission time of a data file. Suppose that the transmission rate in a GSM cell is 9.6 Kbits per second and in a UMTS cell, 144 kbits per second. Say that it takes 6 minutes for a subscriber to move from one cell to the next.

Assume that the subscriber 26 leaves home in cell 14 to go to work 2 in cell 25 by crossing cells 15, 16, 17, 18, 19 and 21 and wants to transmit a 2 M-bytes file. Without the benefit of the present invention, the transmission starts immediately. While crossing cells 15, 16 and 17, 1.24 M-bytes will have been transmitted using GSM. (3×6×60× 9600=10368000 bits. The remainder will be transmitted using UMTS in cell 18. This will require 0.74 minutes (2−1.24)×1024×1024×8/144000=44.5 seconds. The total transmission time is therefore 18.7 minutes.

Using the present invention, the network operator can decide to delay the start of transmission until the moment the subscriber enters the UMTS cell 18. Using UMTS, the transmission time is 2×1024×1024×8/144000=116.5 seconds or 1.94 minutes (which is less than the time the subscriber is in cell 18). So the total transmission time is 1.94 minutes.

If the system fails to predict the correct trajectory for the subscriber 26, the worst case is that the whole file will have to be transmitted through GSM. This requires 29.1 minutes. (2×1024×1024×8/9600=1747.6 seconds or 29.1 minutes).

With a success rate for the system of 90%, the average transmission time is at most 0.1×29.1+0.9×1.94=4.7 minutes. The present invention allows a reduction in transmission time by a fact of 18.74/4.7=4 on average. The probability of having a significant dropped call rate is then much reduced.

We claim:

1. Apparatus for controlling the transmission of data between a base station and a mobile station in a cellular radio telecommunications network, the apparatus comprising;

means for monitoring and storing data relating to the movements of a plurality of individual mobile stations in a designated geographical area included in the network, comprising means for allocating to a plurality of groups those mobile stations among said plurality of mobile stations which share movement characteristics common to all the mobile stations in the respective group and for storing as common the respective movement characteristics for each group, means for receiving a request for transmission of data to or from a current mobile station, means for comparing movements of the current mobile station with the respective stored common characteristics of said groups and determining one of said groups that the movements of the current mobile station best match, means for predicting a trajectory of the current mobile station from the stored common characteristics of said one of said groups, and means for controlling the transmission of data between the base station and the current mobile station dependent upon the predicted trajectory.

2. Apparatus according to claim 1 in which the means for controlling the transmission of data is configured to adjust the rate of transmission of the data between the base station and the mobile station as a function of the predicted trajectory.

3. Apparatus according to claim 1 in which the means for controlling the transmission of data is configured to delay commencement of data transmission as a function of the predicted trajectory.

4. Apparatus according to claim 1 in which the means for grouping is configured to disregard mobile stations comprising said plurality of individual mobile stations which are stationary.

5. A method for controlling the transmission of data between a base station and a mobile station in a cellular radio telecommunications network, the method including the steps of:

monitoring the movements of a plurality of individual mobile stations in a designated geographical area incorporated in the network, storing said data, comprising allocating to a plurality of groups those mobile stations among said plurality of individual mobile stations which share movement characteristics common to all the mobile stations in the respective group, storing as common the respective movement characteristics for each group, receiving a request for transmission of data to or from a current mobile station, comparing movements of the current mobile station with the respective stored common characteristics of said groups and determining one of said groups that the movements of the current mobile station best match, predicting a trajectory of the current mobile station from the stored common characteristics of said one of said groups, and controlling the transmission of data between the base station and the current mobile station dependent upon the predicted trajectory.

\* \* \* \* \*